Figure 1:
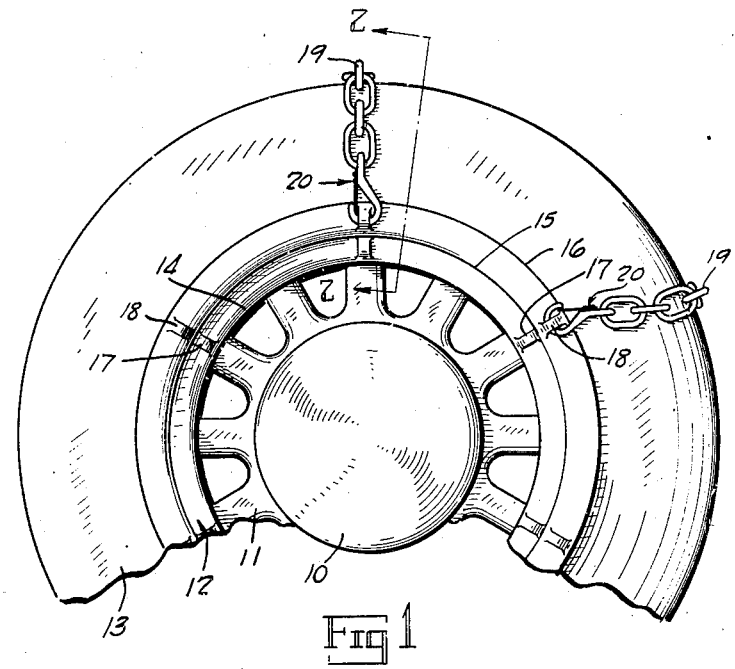

Aug. 24, 1937.  C. J. WATSON  2,091,171

ANTISKID CHAIN AND WHEEL

Filed Nov. 14, 1935

INVENTOR:
CLARENCE J. WATSON
BY
ATTORNEY

Patented Aug. 24, 1937

2,091,171

UNITED STATES PATENT OFFICE 2,091,171

ANTISKID CHAIN AND WHEEL

Clarence James Watson, Drexel Hill, Pa.

Application November 14, 1935, Serial No. 49,716

1 Claim. (Cl. 152—14)

This invention relates to antiskid chains, such as are commonly employed in conjunction with the pneumatic tires of motor vehicles, and is concerned primarily with the manner of affixing antiskid chains in effective positions on the wheels of such vehicles.

At the present time there are available certain types of antiskid chains which, however, are not meeting with the complete approval of the public, as is evidenced by the fact that their use under weather conditions, which indicate they should be used, is not as widespread as it should be to increase the factor of safety in driving to a desired degree.

Perhaps the chief reason why the now known antiskid chains are not used as often as they might be is because of the inconvenience in assembling them in effective positions on the wheels of the motor vehicle. A chain assembly which includes any appreciable number of chains extending across the tread of the tire can be assembled only with a "jacking up" of the vehicle, or by carrying out a highly inconvenient process of spreading the chains out flat on the ground, and backing the car thereover. This last mentioned method, which is the only possible substitute for jacking up the car, usually results in the chain assembly being positioned on the tire in an improper manner that frequently results in the clanking of portions of the chain against the fenders.

Chain assemblies of the character above described ordinarily include a plurality of cross chains which are connected together by circumferentially extending pieces, and the nuisance features above mentioned are inherent to chain assemblies of this type.

This invention recognizes that there has been proposed the use of an individual cross chain with a motor vehicle wheel for antiskid purposes, but such devices have not proven satisfactory in that no means is provided for accurately securing the chains in position on the wheel, and, at best, each individual chain is assembled only with a large amount of trouble due primarily to the fact that each chain is affixed to the wheel only by its wrapping about the tire and rim thereof.

With the foregoing conditions in mind, and to the end of providing an antiskid chain which will meet with public approval to render the use of these devices more widespread for safety purposes, this invention has in view, as an important object, the provision of a motor vehicle wheel which includes means for anchoring the extremities of an antiskid chain thereto.

More particularly, this invention contemplates the use of a plurality of cross chains which are spaced about the tire with the ends of each chain anchored to the rim of the wheel.

Another important object of the present invention is to provide an antiskid chain of the character above described which includes at each extremity a quickly attachable and detachable fastening device which readily facilitates the assembly of the chain on the wheel.

Another more detailed object of the present invention is to provide a steel wheel of the type now meeting with approval in modern car design with loops which are formed between shoulders of the rim, and which loops are intended to constitute means for anchoring the extremities of antiskid chains thereto.

Yet another object of the present invention is to provide in a wheel and chain assembly of the character above described, means for anchoring the antiskid chain in position on the wheel, and which means is adjustable whereby a desired amount of play between the chain and tire is provided.

The design of the modern steel automobile wheel is adapted to the present invention in that the rim thereof ordinarily includes a double shoulder, and this invention contemplates the provision of strips of metal extending between the shoulders of the rim to define anchoring loops and which loops are spaced circumferentially about the rim.

Various other more detailed objects and advantages will in part become apparent and in part be hereinafter stated as the description of the invention proceeds.

The invention, therefore, comprises an automobile wheel having a rim which carries a tire and which rim is formed with spaced shoulders between which extend strips defining loops, together with antiskid chains having a fastening device at each end thereof designed to attach each end of the chain to one of said loops, the chain, in effective position, extending across the tread of the tire.

For a full and more complete understanding of the invention, reference may be had to the following description and accompanying drawing, wherein—

Figure 2:
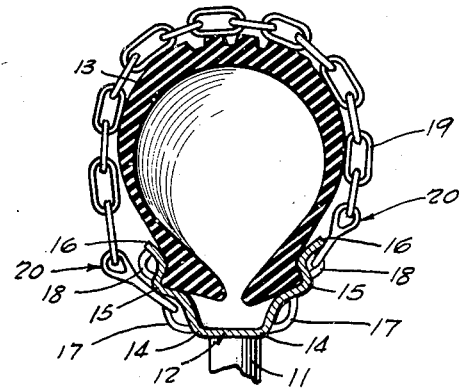
Figure 4:
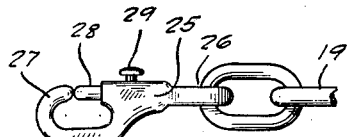
Figure 3:
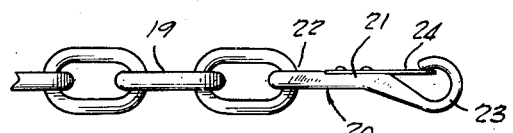

Figure 1 is a view in side elevation of a portion of a present-day motor vehicle wheel with antiskid chains assembled thereon in accordance with the precepts of this invention, Figure 2 is a section through a portion of the rim and tire, this view being taken about on the plane represented by the line 2—2 of Figure 1, Figure 3 is an enlarged detail view of one end of the antiskid chain bringing out the construction of a quickly attachable and detachable fastening device, and Figure 4 is a view similar to Figure 3, showing a somewhat modified form of fastening device.

Referring now to the drawing, wherein like reference characters denote corresponding parts, a present-day motor vehicle wheel is shown as including a hub at 10 from which extends a steel plate construction 11 that supports a rim 12. An ordinary pneumatic tire is indicated at 13 as being carried by the rim 12.

Referring now more particularly to Figure 2, the rim 12 is shown as being formed with a pair of inwardly disposed circumferential shoulders 14, there being a shoulder 14 on each side of the wheel. Likewise, a pair of intermediate shoulders 15 are formed in the rim, one being on each side of the wheel, and the outer peripheral edges of the rim are referred to by the reference character 16.

In Figure 2 a strip of metal is shown as extending from the shoulder 14 to the shoulder 15 to define an inner loop designated 17, while another strip of metal extends from the shoulder 15 to the shoulder 16 to define an outer loop 18, and this construction is repeated on both sides of the wheel so that there are a pair of loops 17 and 18 on each side of the rim 12.

This arrangement is carried out at spaced intervals circumferentially about the rim 12, as clearly shown in Figure 1. In the construction shown in the latter figure, there will be six pairs of anchoring loops on each side of the rim 12 to accommodate six of the antiskid chains now to be described. Obviously, the invention is not to be limited in this respect, however, as the number of the anchoring loops, as well as the corresponding chains, may be varied as occasion demands.

One of the antiskid chains, which is intended to be affixed across the tire 13 in accordance with this invention, is designated 19 and at each extremity the chain 19 is provided with a fastening device referred to as 20.

Referring now more particularly to Figure 3, the fastening device 20 is shown as comprising a shank portion 21 which is linked to the chain 19, as indicated at 22, the extremity of which is formed with a hook 23. A leaf spring 24 extends from the shank 21 and underlies the end of the hook 23. One end of the chain 19 is fastened to one of the loops 17 or 18 by pressing the fastening device 20 thereagainst, with the leaf spring 24 engaging the loops. This causes the loop to be forced under the hook 23, whereupon the spring resumes the position shown at Figure 3 to maintain the device assembled.

Inasmuch as it is important to provide for a certain amount of play between the chain 19 and the tire 13, the arrangement providing a pair of loops at each point of anchorage is important, because this permits of securing the fastening device 20 to either loop 17 or 18 on each side of the rim 12, whereby the amount of play in the chain may be adjusted as desired.

Figure 4 develops a somewhat modified form of fastening device in which a shank 25 is linked to the chain, as shown at 26, and formed with a hook member 27. The shank 25 is provided with a bore which receives a sliding member 28 that may be pushed backwardly against the influence of a spring (not shown) by an operating member 29. When the slide 28 is pushed back the hook 27 may be positioned about one of the loops 17 or 18, whereupon the spring causes the member 28 to resume its locking position.

In the form of the invention illustrated in the drawing, a conventional type of chain is shown, but the particular link construction of this chain is not intended in any way to limit this invention, as any type of antiskid chain may be employed by availing of fastening devices 20 for securing its extremities to one of the loops 17 or 18.

While preferred specific embodiments of the invention are hereinbefore set forth, it is to be understood that I am not to be limited to the exact constructions illustrated and described, because various modifications of these details may be provided in putting the invention into practice, within the purview of the appended claim.

I claim:—

A motor vehicle wheel of the character described, comprising a rim having three shoulders of different radial distances from the center of the wheel, strips of metal extending between adjacent shoulders whereby two sets of anchoring loops are provided, and which anchoring loops are at different radial distances from the center of the wheel, a tire on said rim, an antiskid chain extending across the tire, and a quickly detachable connection at each end of the antiskid chain adapted to cooperate with one set of the said anchoring loops.

CLARENCE JAMES WATSON.